United States Patent [19]
Pet et al.

[11] Patent Number: 5,851,253
[45] Date of Patent: *Dec. 22, 1998

[54] METHOD OF MANUFACTURING QUARTZ GLASS FOR A LAMP VESSEL

[75] Inventors: Robert J. Pet, Winschoten; Josephus J. Timmermans, Eindhoven, both of Netherlands

[73] Assignee: U.S. Philips Corporation, New York, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 734,008

[22] Filed: Oct. 18, 1996

[30] Foreign Application Priority Data

Oct. 18, 1995 [EP] European Pat. Off. ............ 95202812

[51] Int. Cl.$^6$ ................................ C03B 5/00; C03C 3/06
[52] U.S. Cl. ...................... 65/32.1; 65/134.3; 65/134.9; 501/54; 501/134
[58] Field of Search ...................... 313/636, 112, 313/578, 493; 65/134.1, 134.3, 134.4, 134.9, 32.1, 32.5; 501/54, 68, 134, 904

[56] References Cited

U.S. PATENT DOCUMENTS

| 3,527,711 | 9/1970 | Barber et al. ............... 501/54 |
| --- | --- | --- |
| 4,017,758 | 4/1977 | Almer et al. ............... 313/112 |
| 4,336,048 | 6/1982 | Van Der Steen et al. ............ 65/32.5 |
| 4,361,779 | 11/1982 | Van Der Steen et al. ............. 501/54 |
| 4,769,347 | 9/1988 | Cook et al. . |
| 5,003,221 | 3/1991 | Shimizu .................. 313/114 |
| 5,236,876 | 8/1993 | Van Hal et al. ............ 501/54 |
| 5,523,650 | 6/1996 | Terheijden et al. ............ 313/578 |
| 5,541,471 | 7/1996 | Terheijden et al. ............ 313/112 |
| 5,572,091 | 11/1996 | Langer et al. ............. 313/636 |
| 5,589,734 | 12/1996 | Deisenhofer et al. ............ 313/112 |

FOREIGN PATENT DOCUMENTS 0643021  3/1995  European Pat. Off. .

*Primary Examiner*—Steven P. Griffin
*Attorney, Agent, or Firm*—F. Brice Faller

[57] ABSTRACT

The electric incandescent lamp has a quartz glass lamp vessel (1) or envelope (4') around the lamp vessel, which has a red coloured dope in the area at the side of the incandescent body (3). The quartz glass with red dope contains samarium$^{II}$ oxide, aluminium oxide, titanium dioxide, and silicon dioxide, the analysis of the glass in its oxidized form being $Sm_2O_3$ 1 to 3% by weight, $Al_2O_3$ up to 3% by weight, $TiO_2$, rest $SiO_2$, the molar ratio Al/Sm being at least about 2 and the molar ratio Sm/Ti being from 2 to 8.

5 Claims, 2 Drawing Sheets

METHOD OF MANUFACTURING QUARTZ GLASS FOR A LAMP VESSEL

BACKGROUND OF THE INVENTION

The invention relates to an electric incandescent lamp with a quartz glass lamp vessel having an axis, an incandescent body being positioned in an axial portion of said lamp vessel and being laterally surrounded by quartz glass with samarium$^{II}$ oxide as a red dopant, which quartz glass upon analysis in oxidized form comprises, besides $SiO_2$ and oxides of trace elements, 1 to 3% $Sm_2O_3$ by weight and up to 3% $Al_2O_3$ by weight, the molar ratio Al/Sm being at least approximately 2.

Such an electric lamp is known from EP-A-0 643 021, which corresponds to U.S. Pat. No. 5,523,650.

The known lamp can be used as an IR radiation source. A major portion of the light generated by the lamp, which would be undesirable, is removed by the red color of the doped quartz glass.

Samarium is trivalent in the stable form of samarium oxide($Sm_2O_3$). This oxide is substantially colorless. Samarium$^{II}$ oxide ($Sm_2O_3$) is a dark red, but it is readily oxidized so that it is not available as such. Accordingly, metallic silicon or SiO is added to the batch during the manufacture of the quartz glass doped with samarium$^{II}$ oxide so as to reduce $Sm^{III}$ to $Sm^{II}$ in the melt. An attractive feature is that $SiO_2$ is created thereby, so that no additional component is introduced into the glass.

It is a disadvantage of the known lamp that comparatively many elongate gas bubbles occur in the doped quartz glass, which give the glass a striped appearance. These gas bubbles have little influence on the spectrum radiated by the lamp, but they do reflect radiation and give an impression of indifferent quality.

SUMMARY OF THE INVENTION

It is an object of the invention to provide an electric incandescent lamp of the kind described in the opening paragraph of which the doped quartz glass has few or no gas bubbles.

According to the invention, this object is achieved in that the quartz glass doped with samarium$^{II}$ oxide also comprises $TiO_2$, the molar ratio Sm/Ti lying within a range from 2 to 8.

The $TiO_2$ originates from TiO in the batch and is formed during the reduction of $Sm_2O_3$. It was found that the use of TiO strongly reduces the number of gas bubbles, or even prevents them altogether. This is in contrast to the number of bubbles arising when metallic Ti is added to the batch. The Sm/Ti ratio in the glass is accordingly lower than it could be theoretically, i.e. if half the quantity of metallic Ti were added to the batch. The The quantity of ingredients of the doped quartz glass other than $SiO_2$ is limited in order to prevent the properties of the glass changing too much and to prevent the glass having too low a softening temperature or being too brittle.

$Al_2O_3$ is present in the glass for achieving a sufficient solubility of the samarium in the glass, and accordingly achieving a homogeneous and deeper coloring. The Al/Sm ratio is at least approximately 2 for this purpose, but on the other hand the quantity of $Al_2O_3$ is limited to avoid said undesirable changes in the properties of the quartz glass. The quantity of $Sm_2O_3$ is bound to a minimum on the one hand, so as to realize a sufficient red coloring of the glass, and to a maximum on the other hand so as to prevent the glass being insufficiently homogeneous for practical applications.

The maximum quantity of $TiO_2$ in relation to the quantity of $Sm_2O_3$ is also limited to that which is theoretically necessary for reducing the quantity of $Sm^{III}$ to $Sm^{II}$, in order to prevent undesirable changes in the properties of the quartz glass. On the other hand, the minimum quantity of $TiO_2$ is determined by the required color of the doped quartz glass. In general, the Sm/Ti ratio will be chosen to lie between 3 and 6, preferably between approximately 4 and approximately 5.

Trace elements which may be present as impurities may be sodium and potassium, each to a quantity of several ppm by weight, and iron, up to a few tenths of a ppm by weight.

The lamp according to the invention may be used for heating purposes, for example for heating of rooms, the preparation of foods, such as cooking, or as a heat source for industrial processes such as drying of ink or paint. The purpose of the red quartz glass is to prevent the light generated by the lamp from being radiated with an unpleasant intensity.

In spite of its color, a tube made of the doped quartz glass can be processed, for example for providing a vacuumtight seal therein. It is necessary, however, to use a stronger heat source for this than for a corresponding tube of colorless quartz glass because the red quartz glass radiates much heat. Those skilled in the art may readily ascertain in a few tests the configuration of heat sources, such as burners, required for a certain tube and the processing thereof, for example bending, inflating, upsetting-and-inflating, pulling-out, etc. Alternatively, a tube made of such quartz glass may be, for example, fused to tubes of non-doped quartz glass at both ends and the resulting tube may be processed into a lamp vessel, so that the lamp vessel is formed by the doped quartz glass over an axial portion only which laterally surrounds the incandescent body.

The doped quartz glass may be present around the lamp vessel in the form of a tube or may be coupled thereto, for example detachably, or, for example, by means of resilient members. Alternatively, the tube may be held by a lamp cap connected to the lamp vessel, for example, may be enclosed between two lamp caps connected to the lamp vessel and placed opposite one another. It is favorable when a metal holder is accommodated in each lamp cap and has an end portion which encloses an end portion of the tube so as to keep the tube securely fixed.

The quartz glass with the red dope has an orange-red to dark red color and can be readily manufactured from the batch at a temperature of, for example, approximately 2,000° C., for example in vacuum or in a reducing atmosphere such as, for example, $He/H_2$, for example $He/H_2$ 7/3 (by volume), and can be given a tubular shape by usual techniques.

The presence of $Sm^{II}$ manifests itself in the color of the doped quartz glass and its transmission spectrum. It is difficult, however, to determine the $Sm^{II}$ content of the glass besides any $Sm_{III}$, if present, analytically because of the proneness to oxidation of the former.

DETAILED DESCRIPTION OF THE PREFERRED EMBODIMENTS

Figure 1:
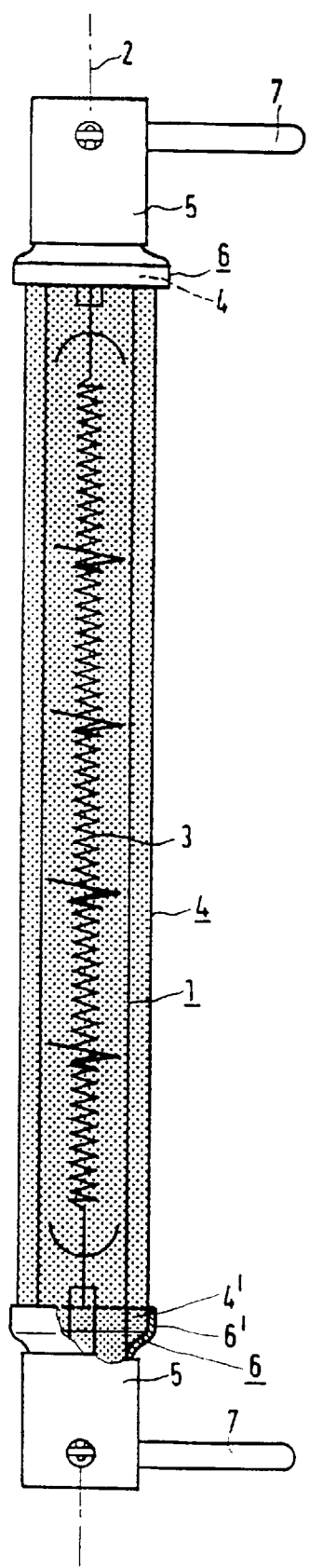
FIG. 1 shows a lamp in side elevation, partly broken away.

In FIG. 1, the electric incandescent lamp has a quartz glass lamp vessel 1 with an axis 2, and an incandescent body 3 is arranged in an axial portion of this lamp vessel. The lamp vessel is filled with an inert gas comprising hydrogen bromide. The incandescent body is laterally surrounded by quartz glass 4 with samarium$^{II}$ oxide as a red dopant. This quartz glass, when analyzed in oxidized form, is found to comprise besides $SiO_2$ and oxides of trace elements also 1 to 3% $Sm_2O_3$ by weight and up to 3% $Al_2O_3$ by weight. The molar ratio Al/Sm is at least approximately 2.

The quartz glass 4 doped with samarium$^{II}$ oxide also comprises $TiO_2$. The molar ratio Sm/Ti here lies within the range from 2 to 8, in particular within the range from 3 to 6 and more particularly between 4 and 5.

In FIG. 1, a tube made of the quartz glass doped with samarium oxide and having end portions 4' surrounds the lamp vessel 1. The lamp vessel has two mutually opposed lamp caps 5 in each of which a metal holder 6 is accommodated having an end portion 6' which encloses an end portion 4' of the relevant tube so as to keep this tube securely fixed. Contact pins 7 project from the lamp caps 5.

To manufacture the quartz glass tube, 290 g $SiO_2$, 4.1 g $Al_2O_3$, and 7.0 g $Sm_2O_3$ were mi fed and fired in the air at approximately 1,300° C. so as to drive out moisture. The mixture was granulated and mixed with 0.67 g TiO. The batch thus obtained was melted at approximately 2,100° C. under 70% He and 30% $H_2$ by volume, and the molten material was drawn into a tube shape.

The doped glass thus obtained has the following composition in oxidized form: approximately 290 g $SiO_2$, approximately 4.1 g $Al_2O_3$ (1.3% by weight), approximately 7.0 g $Sm_2O_3$ and SmO (2.3% by weight), and approximately 0.83 g $TiO_2$. The molar ratio Al/Sm is 2 and the molar ratio Sm/Ti is 4.

Figure 2:
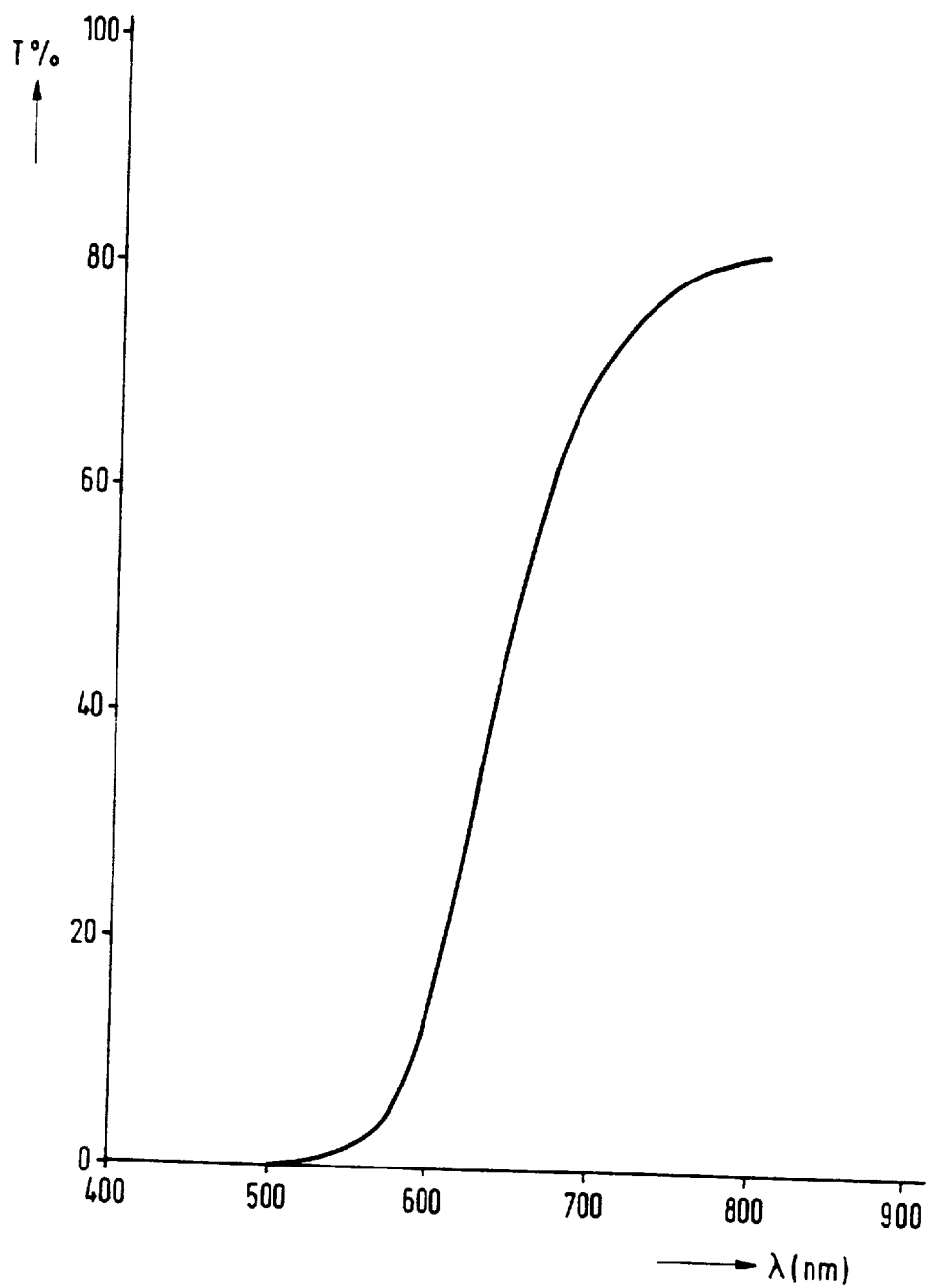
FIG. 2 shows the transmission spectrum of the doped quartz glass of FIG. 1.

The glass has the transmission spectrum of FIG. 2 measured for a glass thickness of 1 mm. It is apparent therefrom that the glass is fully opaque to radiation below approximately 525 nm.

We claim:

1. A method of manufacturing quartz glass doped with $Sm^{II}$ oxide, said method comprising providing a mixture of $SiO_2$ containing 1 to 3% $Sm_2O_3$ by weight, up to 3% $Al_2O_3$ by weight, and TiO, wherein the molar ratio of Al/Sm is at least approximately 2, and the molar ratio of Sm/Ti lies within the range of 2 to 8, heating the mixture so that it melts to form a quartz glass and so that Tio is converted to $TiO_2$ and $Sm_2O_3$ is converted to SmO in an amount sufficient to impart an orange red to dark red color in the glass.

2. A method as in claim 1 wherein said mixture is heated to a temperature of approximately 2000° C. for melting.

3. A method as in claim 1 wherein said mixture is heated in a reducing atmosphere.

4. A method as in claim 3 wherein said reducing atmosphere He/$H_2$.

5. A method as in claim 1 wherein said quartz glass is formed into a tube.

\* \* \* \* \*